United States Patent
Montagut Sala et al.

(10) Patent No.: US 10,674,867 B2
(45) Date of Patent: Jun. 9, 2020

(54) FOLDABLE CONTAINER

(71) Applicant: DODE, S.A., San Cugat del Valles (ES)

(72) Inventors: Salvador Montagut Sala, San Cugat del Valles (ES); Jordi Campa Anfruns, San Cugat del Valles (ES)

(73) Assignee: Dode S.A, Barcelona (ES)

( * ) Notice: Subject to any disclaimer, the term of this patent is extended or adjusted under 35 U.S.C. 154(b) by 1174 days.

(21) Appl. No.: 14/394,314

(22) PCT Filed: Jun. 21, 2013

(86) PCT No.: PCT/ES2013/070410
§ 371 (c)(1),
(2) Date: Oct. 14, 2014

(87) PCT Pub. No.: WO2014/202800
PCT Pub. Date: Dec. 24, 2014

(65) Prior Publication Data
US 2016/0198892 A1   Jul. 14, 2016

(51) Int. Cl.
*A47J 36/02* (2006.01)
*B65D 81/34* (2006.01)
*B65D 5/36* (2006.01)

(52) U.S. Cl.
CPC .......... *A47J 36/027* (2013.01); *B65D 5/3621* (2013.01); *B65D 81/3453* (2013.01); *B65D 2581/3421* (2013.01); *B65D 2581/3494* (2013.01); *B65D 2581/3498* (2013.01)

(58) Field of Classification Search
CPC ........... A47J 36/027; B65D 2581/3421; B65D 2581/3494; B65D 2581/3498; B65D 5/3621; B65D 5/5455; B65D 77/02; B65D 81/3453

USPC ....... 219/725; 220/573.1; 426/104; 99/323.5
See application file for complete search history.

(56) References Cited

U.S. PATENT DOCUMENTS

| | | | | |
|---|---|---|---|---|
| 727,723 A | * | 5/1903 | Webb | B65D 5/0254 229/153 |
| 1,715,173 A | * | 5/1929 | Opitz | A01M 1/02 43/131 |
| 3,768,720 A | * | 10/1973 | Bundy | B65D 5/06 229/117.25 |
| 4,248,901 A | * | 2/1981 | Austin | B65D 71/46 426/119 |
| 4,260,101 A | * | 4/1981 | Webinger | B65D 5/0005 229/101 |

(Continued)

FOREIGN PATENT DOCUMENTS

| | | | | |
|---|---|---|---|---|
| JP | 07291367 A | * | 11/1995 | B65D 33/06 |
| WO | 00/61456 A2 | | 10/2000 | |

OTHER PUBLICATIONS

Supplementary European Search Report dated Jan. 2, 2017 for Application No. EP 13 88 7245.

*Primary Examiner* — Ernesto A Grano
(74) *Attorney, Agent, or Firm* — Ladas & Parry LLP

(57) ABSTRACT

A foldable container for use in microwave ovens that comprises a first section that defines a hollow volume; with the first section closed by a second folded section that is adapted to unfold automatically between a folded configuration in a flower pattern and an expanded configuration, providing an open upper base to the unfolded container.

11 Claims, 3 Drawing Sheets

(56) References Cited

U.S. PATENT DOCUMENTS

| | | | | |
|---|---|---|---|---|
| 4,279,933 A | * | 7/1981 | Austin | B65D 5/0005 426/124 |
| D264,688 S | * | 6/1982 | Austin | D9/433 |
| 4,442,624 A | * | 4/1984 | Browne | A01M 1/02 43/107 |
| 4,448,309 A | * | 5/1984 | Roccaforte | B65D 81/3453 206/525 |
| 4,453,665 A | * | 6/1984 | Roccaforte | B65D 5/2033 229/108.1 |
| 4,534,505 A | * | 8/1985 | Montealegre | B65D 5/0005 229/108 |
| 4,584,202 A | * | 4/1986 | Roccaforte | B65D 5/542 229/242 |
| 4,734,288 A | * | 3/1988 | Engstrom | B65D 81/3453 156/275.7 |
| 4,795,082 A | * | 1/1989 | Fujihara | B65D 5/06 229/109 |
| 4,930,680 A | * | 6/1990 | Hanus | B65D 5/06 229/110 |
| 5,193,822 A | * | 3/1993 | Bonell | F16J 15/127 277/598 |
| 5,214,257 A | * | 5/1993 | Riskey | B65D 71/063 219/733 |
| 5,534,505 A | | 7/1996 | Widauer | |
| 5,558,272 A | * | 9/1996 | Magister | B65D 5/06 229/109 |
| 5,676,306 A | * | 10/1997 | Lankin | B65D 3/20 229/138 |
| 6,410,065 B1 | * | 6/2002 | Nottingham | A63H 3/06 206/457 |
| 6,870,145 B2 | * | 3/2005 | Watkins | B65D 81/3453 219/725 |
| D534,424 S | * | 1/2007 | Ellman | D9/430 |
| 7,928,349 B2 | * | 4/2011 | Fitzwater | B65D 75/5888 219/730 |
| 8,763,887 B2 | * | 7/2014 | Nieto | B65D 5/029 229/109 |
| 2003/0106899 A1 | * | 6/2003 | Langen | B65B 9/087 99/323.5 |
| 2005/0008736 A1 | | 1/2005 | Egan et al. | |
| 2005/0077291 A1 | * | 4/2005 | Baker | B65D 5/3621 219/725 |
| 2006/0219765 A1 | * | 10/2006 | Snyder | B65D 5/0281 229/117 |
| 2010/0140333 A1 | * | 6/2010 | McDonald | B65D 5/22 229/117.01 |
| 2011/0095076 A1 | * | 4/2011 | Knighton | B65D 5/3621 229/185 |
| 2011/0259948 A1 | * | 10/2011 | Little | B65D 5/0227 229/150 |
| 2011/0290809 A1 | * | 12/2011 | Liebowitz | B65D 5/02 220/602 |
| 2012/0104081 A1 | * | 5/2012 | Goldberg | B65D 5/3621 229/120.08 |

\* cited by examiner

FOLDABLE CONTAINER

RELATED APPLICATION INFORMATION

This application is a 371 of International Application PCT/ES2013/070410 filed 21 Jun. 2013 entitled "Foldable Container", the content of which is incorporated herein by reference.

PURPOSE OF THE INVENTION

This invention refers to a foldable cardboard container for the preparation of foods in microwave ovens.

STATE OF THE ART

The packaging of popcorn kernels in a microwaveable bag is known in the state of the art.

The microwaveable folded paper bag comprises the kernels and microwave susceptors, which are devices that heat up in response to microwave energy, converting the microwave energy into thermal energy to generate radiant heat to the surface of the foods that are in contact with the microwave susceptors. This way, the microwave susceptors convert part of the incident microwave radiation into radiant or conventional heat, which helps cook the unpopped popcorn kernels.

This cooking is produced by heating by conduction, convection, and/or radiant heating, in addition to the cooking generated by the microwave radiation that has passed through the susceptor laminate.

Susceptors are secured to the inner surface of outer side of the folded paper bag that is in contact with the rotating tray of the microwave oven.

The inclusion of susceptors inside the folded paper bag is to generate the highest temperatures and the greatest amount of radiant heat possible, in order to shorten cooking or heating time, which represents a significant advantage of microwave ovens. The susceptors transmit the generated heat with the same speed to the kernels that are near the susceptor surface.

As the popcorn kernels acquire cooking temperature, they explode when the water contained inside the kernel expands. Water vapour is released, expanding or unfolding the folded paper bag. At the same time, the starch inside the popcorn swells and spills out, cooling immediately and taking on the strange shape of popped popcorn.

After several minutes, all of the kernels have popped and the paper bag can be removed from the microwave oven to begin consuming the popcorn.

The disadvantage of this method of preparation of popcorn is that the unfolded paper bag must be opened before the popcorn can be eaten. This releases the water vapour contained inside the bag, which is at a high temperature and could cause burns to the fingers of the consumer that are used to open the paper bag and/or on other parts of the body, if the bag is opened carelessly.

ABSTRACT

This invention seeks to resolve one or more of the aforementioned disadvantages using a foldable container as claimed in the claims.

One object is to provide a foldable container that is adapted to package microwaveable popcorn kernels. The popcorn kernels may be previously packaged in a microwaveable bag.

The foldable container comprises a first section that defines a hollow volume; with the first section closed by a second folded section that is adapted to unfold automatically between a folded configuration in a flower pattern and an expanded configuration in the form of a parallelepiped, with an open upper base to access the popped popcorn.

The folded configuration of the container is the configuration for the packaging of the popcorn kernels, whether loose or in a bag, and the microwave susceptors.

The foldable container comprises a construction that allows the container to expand selectively between the folded configuration and the expanded configuration, which provides a container that is open at the upper base.

The foldable container comprises two structural sections, a first parallelepiped section with fixed predetermined dimensions, and a second section with side walls that unfold from a configuration in which they are folded onto each other in a flower pattern and an open expanded configuration.

The popcorn kernels are packed in the first section of the foldable container as loose kernels or packaged in a microwaveable bag, along with microwave susceptors that adhere to the interior surface of a lower flap that forms part of the bottom of the container, and the second foldable section of the container is expandable when the popcorn kernels are exposed to the energy of the microwave oven as the kernels pop, leaving the container unfolded, upright, and with the possibility of being used as a box with rigid walls, for access to the popped corn through the open upper base of the unfolded container.

The foldable container unfolds automatically as the popcorn kernels burst due to the action of the heat generated inside the folded container, defining a container with a hollow polyhedral shape that is closed on the bottom and open at the upper base. The unfolded container may take different parallelepiped or inverted truncated pyramid shapes, so that the side walls extend upwards in a substantially vertical manner during normal use of the unfolded container.

It is important to note that if the popcorn kernels are packaged in a microwaveable bag, the bag is also opened as the popcorn kernels burst due to the action of the heat generated inside the folded container.

As a result, the foldable container allows the loose popcorn kernels or the microwaveable bag in which the popcorn kernels are packed to be dispensed and packaged before the preparation of the popcorn by popping the popcorn kernels once the container is placed inside the microwave oven, so that, once the popcorn kernels have popped, the popcorn that is obtained is ready to be eaten directly through the upper base of the container that has expanded automatically, avoiding the need for the consumer to previously open the bag and/or container.

The foldable container comprises the lower bottom base which supports the lower side walls of a first polygonal section with a predetermined height based on the target dosing of loose popcorn kernels or the size of the microwaveable bag in which the popcorn kernels are packed, which is deposited inside the foldable container. The lower side walls are mechanically connected to the upper side walls of a second folding section to define a hollow closed volume, such that the folded upper side walls form an upper base of the cover of the folded container.

The folded container is made with a single cut of flexible or semi-rigid material such as cardboard, food-safe cardboard, cardboard for use inside microwave ovens. The packaging bag is made of paper.

The fabrication of the foldable container is simple due to the automation of the folding and filling of the same container with loose popcorn kernels or a microwaveable bag adapted for packaging loose popcorn kernels, adhesion of the microwave susceptor to the interior side of the lower flap that forms part of the bottom of the container and the packaging of the foldable container.

BRIEF DESCRIPTION OF THE FIGURES

A more detailed description of an implementation is provided in the following description, which is based on the attached figures.

DESCRIPTION OF THE IMPLEMENTATION

Figure 1:
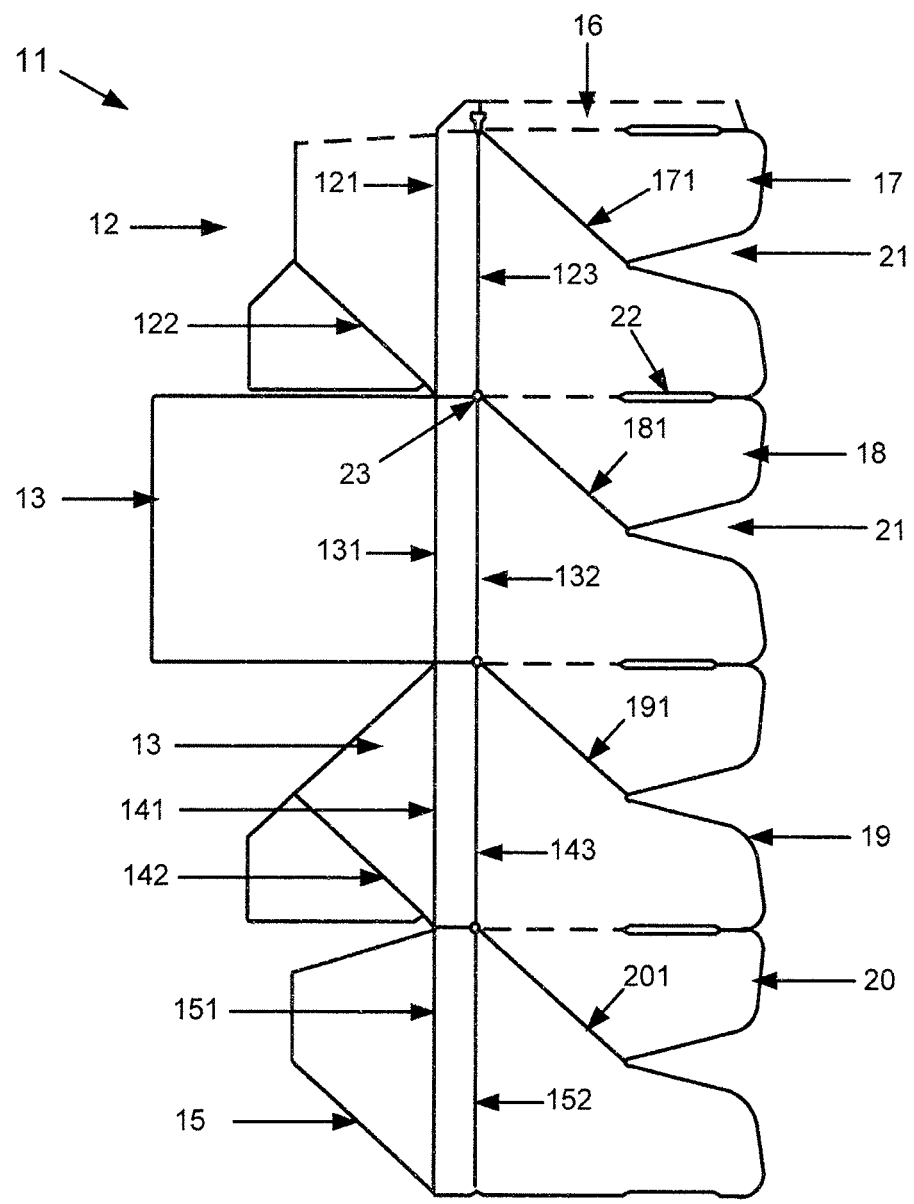
FIG. 1 shows a piece of material out of which a foldable container can be constructed.
Figure 2:
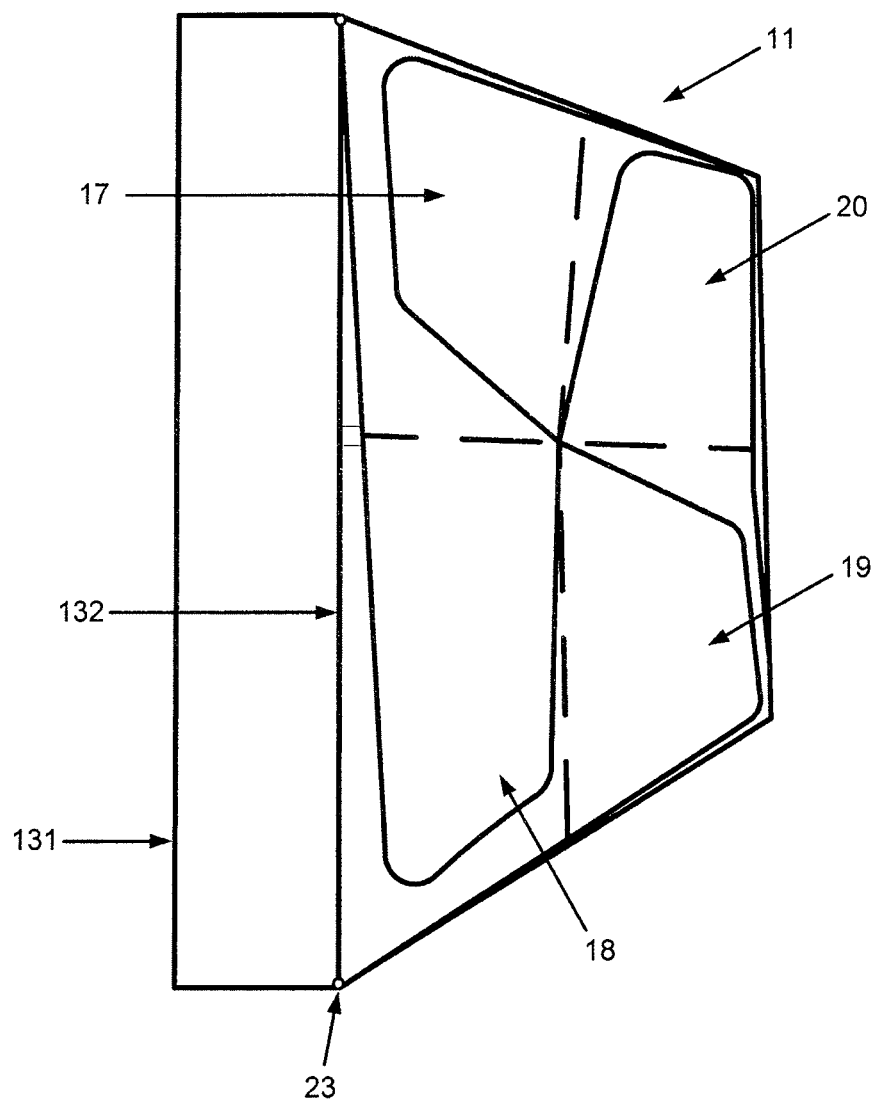
FIG. 2 shows a perspective view of the folded container.
Figure 3:
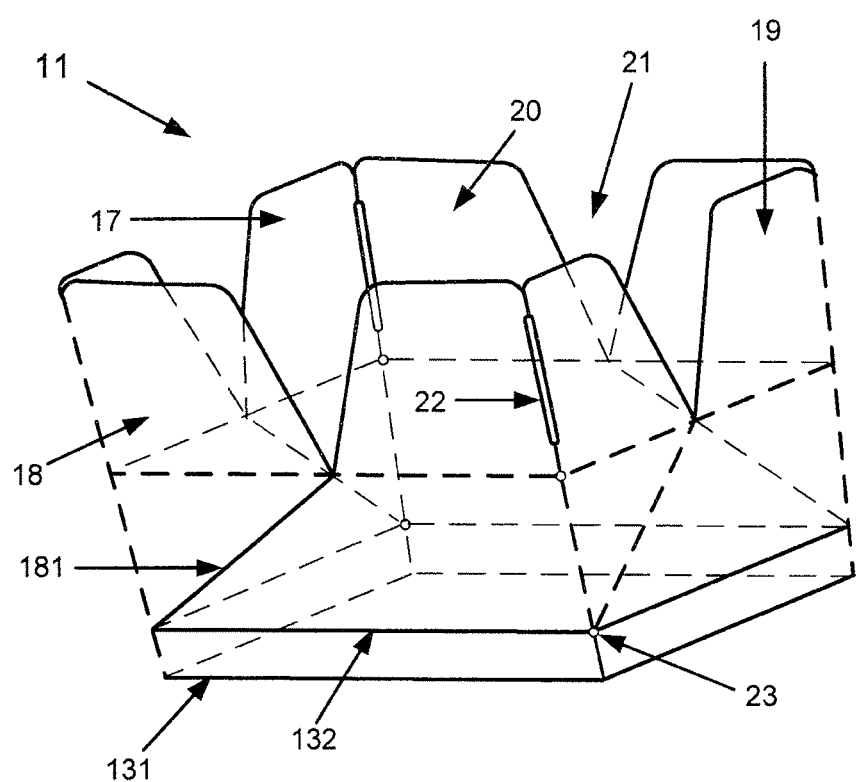
FIG. 3 shows a perspective view of the unfolded container.

One implementation with FIGS. 1 to 3 shows a foldable container 11 for packaging loose popcorn kernels or a packaging bag of loose popcorn kernels for popping in microwave ovens.

The container 11 is foldable to define a hollow closed volume with the general shape of a truncated conical parallelepiped box that comprises a lower bottom base and four side walls.

The container 11 may contain a food product similar to loose popcorn kernels or a packaging bag of loose popcorn kernels. The container 11 is adapted to be heated inside a microwave oven.

The container 11 may be formed out of a cardboard type material adapted to be folded automatically, food-safe, and for use inside microwave ovens.

Now in relation to FIG. 1, the foldable container 11 is made by folding a single piece of flexible or semi-rigid cardboard. The container includes a glued vertical side flap 16 that adheres using a known method with mechanical chemical anchoring means, for example glue, adhesive to one side wall 20 of the container 11.

The single piece comprises a number of lines of marks or grooved folds that facilitate the uniform folding or bending of the components of the single piece towards the inside to construct the container 11 simply, manually and/or automatically.

The container 11 comprises a first polygonal section with a predetermined height for packaging a predetermined quantity of loose popcorn kernels or popcorn kernels packaged in a microwaveable bag, and a microwave susceptor.

The lower bottom base of the first section is made in a known manner by fitting the three tabs 12, 14, 15 together, alternating and overlaying them, with the lower bottom base covered by a single bottom flap 13. Two tabs 12, 14 comprise diagonal folds 122, 142 to facilitate the formation of the lower bottom base.

The susceptor is secured by a mechanical chemical anchoring method such as glue or adhesive to the interior surface of the full square polygonal lower flap 13. The rest of the tabs 12, 14, and 15 have polygon shape of a truncated pyramid, truncated triangle, or similar shape.

The edges of the fins 12, 14, 15 and the lower flap 13 that make up the lower base are continued by the lower side walls which fold vertically along the corresponding folds 121, 131, 141, 151 to form a rectangular or square polygon, with the height of the polygon determined by the target dosing of loose popcorn kernels or the packaging bag with the popcorn kernels that can be packed inside the enclosed volume of the first polygonal section.

The susceptor is secured to the internal surface of the lower bottom flap 13 of the first section, on which the popcorn kernels or bag are placed, so that the popcorn kernels are stored compactly and close to the microwave susceptor. The microwave susceptor generates high temperatures and the greatest amount of radiant heat possible in order to shorten the cooking or heating time of the popcorn kernels so that they will burst and break the microwaveable bag, if the bag is included inside the container 11, and in turn expand the folded container 11.

A series of edge folds 123, 132, 143, 152 separate the lower side walls from the first section and upper side walls 17 to 20 of a second section, with the upper side walls 17 to 20 generally rectangular in shape and forming a second foldable polygonal section.

Now in regard to FIGS. 2 and 3, the second section has an initial folded configuration to form an upper base of the cover of the folded container 11, defining the hollow enclosed volume on the top of the container 11, and a second unfolded or expanded configuration, defining the upper open base of the unfolded container 11.

Returning to FIG. 1, a cutout 21 in the shape of an inverted arrow is formed on each one of the upper edges of the upper side wall 17, 18, 19, 20 towards the folds 123, 132, 143, 152 of the first section, in such a way that one side of the cutout 21 continues along an angled fold 171, 181, 191, 201 towards an upper vertex formed by the first section and the second section when the container 11 is folded. The angled folded line 171, 181, 191, 201 along with the horizontal folds 123, 132, 143, 152 that separate the lower and upper side walls define a triangle shape on the bottom part of the upper side wall 17 to 20 of the second section.

The fold lines 171, 181, 191, 201 and bend lines 123, 132, 143, 152 of the upper side walls of the second section allow and facilitate the folding of the second section towards the inside by bending and folding the upper side walls 17 to 20, on top of each other, from a central vertical axis, namely side walls 17 to 20 are folded towards the inside, overlapping each other from the central vertical axis towards the outside of the folded container 11, in the form of a spiral staircase, to adopt a shape that is held in the closed or covering position.

A lengthwise vertical opening 22 is made in the vertical fold between two adjacent upper side walls to facilitate the folding and unfolding of the second section.

A circular opening 23 is also made in the connection between the diagonal fold of one upper side wall and a horizontal fold of a lower side wall.

The container 11 is formed by gluing a vertical side tab 16, which extends from an outer vertical edge of a first side wall, to an edge segment of the interior surface of a second side wall of the container 11.

Once the loose popcorn kernels or the bag with the packed popcorn kernels has been packaged in the container 11, the second section adopts the folded configuration in the shape of a flower, to form the closed upper base of the cover that closes the folded container 11.

The container 11 opens automatically by movement of petals of the flower pattern from a folded closed position to an open position in which said petals form upper side walls surrounding an upper opening in the container as a result of the popping of the popcorn kernels inside the microwave oven, which at the same time breaks open any bag containing the kernals during popping in such a way that the second folded section of the container 11 unfolds, with the unfolded container 11 having an opening at the top to access the popped popcorn without risk of burns.

In summary, the foldable container 11 is opened as the second section of the container opens automatically as a result of the popping of the popcorn kernals, unfolding the petals of the upper base of the cover of the container 11, which allows the water vapour to be released progressively and prevents the concentration of this residual heat.

Therefore, the container 11 is filled with popcorn ready for consumption, without the need to tear or cut a bag.

The invention claimed is:

1. A container containing popcorn kernels for use in microwave ovens, comprising a first section having lower side walls that defines a hollow volume containing the popcorn kernels, the hollow volume being closed by a second foldable section configured to allow folding in a flower pattern of overlapping petals, the second foldable section being further configured to allow the second foldable section to open by movement of the petals of the flower pattern from a folded closed position where there is overlap between the petals to an open position in which the petals form upper side walls surrounding an upper opening in the container in response to the force resulting from explosion of the popcorn kernels being heated by a microwave oven, a fold tine being located between the upper side walls and the lower side walls; lengthwise openings being arranged in the upper part of a vertical fold between adjacent upper side walls; diagonal fold lines extending across at least the lower part of the upper side walls to provide for overlap of the petals when the container is in a closed condition; and circular openings being located at the connection between the diagonal fold lines of the upper side walls and the fold line between the upper side walls and the lower side walls.

2. The container in accordance with claim 1, wherein the first section of the container comprises microwave susceptors.

3. The container in accordance with claim 1, wherein a cutout in the shape of an inverted arrow is formed on each upper side wall from the upper edges towards the fold line between the upper side walls and the lower side walls.

4. The container in accordance with claim 3, wherein one side of the cutout continues along an angled fold towards a circular opening formed by the first section and the second foldable section of the container.

5. The container in accordance with claim 4, wherein each of the diagonal lines in conjunction with the fold line between the lower side walls and the upper side was define a triangle shape on the bottom part of the second foldable section.

6. The container in accordance with claim 5, wherein the fold lines and bend lines of the upper side walls of the second foldable section allow the folding of the second foldable section towards the inside of the container by bending and folding the upper side walls, on top of each other, from a central vertical axis.

7. The container in accordance with claim 6; wherein the second foldable section holds the upper side walls in the closed position.

8. The container in accordance with claim 7, wherein the second foldable section is adapted to provide a top open base for accessing the popped popcorn.

9. The container in accordance with claim 1, wherein the container is made of a single piece of flexible or semi-rigid material.

10. The container in accordance with claim 9, wherein the material is food-grade cardboard or microwaveable cardboard.

11. The container in accordance with claim 9, wherein the container is made of paper.

\* \* \* \* \*